Aug. 9, 1932.                C. F. REITER                1,871,084
SELF CLEANING RAKE ATTACHMENT
Filed Dec. 31, 1930
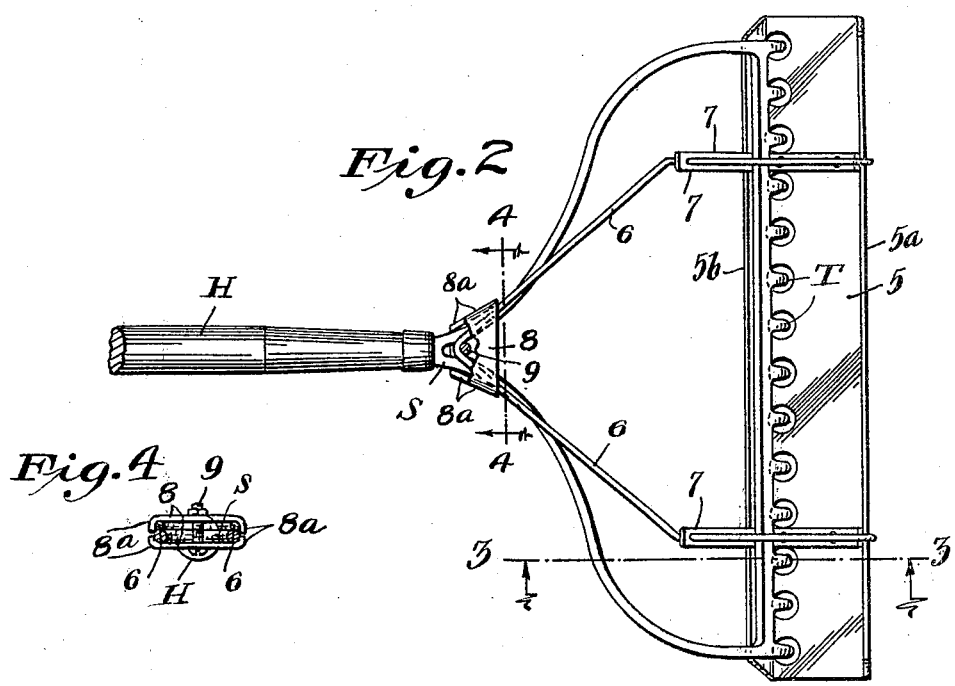
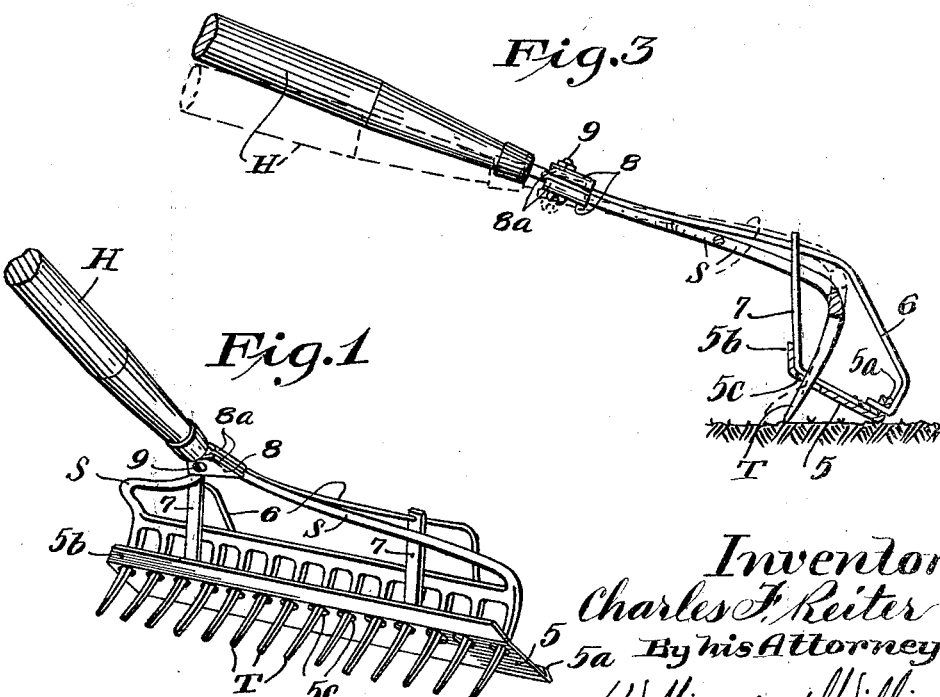
Inventor
Charles F. Reiter
By his Attorneys
Williamson & Williamson Patented Aug. 9, 1932

1,871,084

UNITED STATES PATENT OFFICE

CHARLES F. REITER, OF MINNEAPOLIS, MINNESOTA

SELF-CLEANING RAKE ATTACHMENT

Application filed December 31, 1930. Serial No. 505,726.

This invention relates to lawn and garden rakes and more particularly to a self-cleaning attachment for the same, which is adapted to automatically remove leaves, grass or rubbish from the teeth of a rake as the same is being used.

My present invention is an improvement upon the structure disclosed in U. S. Letters Patent No. 1,251,284 issued jointly to myself and Joseph W. Reiter on December 25th, 1917.

It is an object of my present invention to provide an improved and more efficient self-cleaning rake attachment which is strong and durable and which may be manufactured at lower cost, which may be more universally utilized in association with conventional lawn and garden rakes now marketed and which is resiliently and automatically operated by the upward pressure of material collecting in the rake teeth and the subsequent release of said pressure when the rake is raised from the ground in the conventional use thereof.

More specifically it is an object to provide an improved device of the class described wherein a resiliently actuated stripper plate is associated with the teeth of a rake and is provided with apertured portions closely cooperating with the teeth to remove accumulated rubbish therefrom and to prevent wedging of material between the stripping elements and the teeth.

Another object is to provide a self-cleaning rake attachment which will frictionally engage and smooth the dirt or ground behind the rake head and which has an improved function in scraping and assisting in the collection of finely divided and small material which has a tendency to pass through the teeth of a rake.

These and other objects and advantages of the invention will be fully set forth in the following description made in connection with the accompanying drawing, in which like reference characters refer to similar parts throughout the several views, and in which:—

Fig. 1 is a perspective view of the forward portion of a rake having an embodiment of my invention associated therewith;

Fig. 2 is a top plan view of the same;

Fig. 3 is a cross section taken on the line 3—3 of Fig. 2, the dotted lines indicating the position of the rake handle and the rake head relative to the stripper plate when the rake has been raised from the ground as in the normal use of the same between raking strokes, and Fig. 4 is a cross section taken on the line 4—4 of Fig. 2 showing a certain attachment means for mounting my improved device upon the shank of a convention rake head.

In the drawing an embodiment of my invention is illustrated as operatively applied to a conventional garden rake having the usual rake head provided with the slightly curved teeth T and connected with the handle H by means of a widely bifurcated shank S.

My improved attachment includes an elongated preferably integral stripper plate 5 which may be conveniently constructed from sheet metal having an up-turned flange 5a at its forward edge and an upwardly inclined relatively narrow flange 5b at its rearward edge. Stripper plate 5 is provided with a series of aligned apertures 5c corresponding to the teeth of the rake head and of somewhat larger diameter than the largest cross sectional area of said teeth. The series of apertures 5c is disposed in a line adjacent the rearward edge of the plate and each apertured portion surrounds one of the teeth T with the longitudinal edges of the teeth disposed close to the rearward edges defining the apertures when the rake head is removed from the ground.

Stripper plate 5 is yieldingly supported from the shank of the rake head or if desired from the rake handle by means of a resilient yoke which may comprise diverging arms or rods 6 constructed of spring metal, said arms extending over the top of the rake head and being curved downwardly at their outer extremities which are secured suitably to the forward upstanding flange 5a of the stripper plate. The connection of the resilient arms 6 with the stripper plate may be re-enforced by means of angle strips or braces 7 having base portions attached to the upper surface of plate 5 and upstanding portions connected with the medial portions of arms 6. Arms 6 are preferably bent from an integral resilient rod and diverge from a suitable attachment or clamping bracket comprising cooperating clamping plates 8 which are adapted to surround the shank of the rake head or which may be constructed of suitable shape to engage the forward end of the rake handle. As illustrated, clamping plates 8 have turned flanges 8a which are adapted to surround and engage the bifurcated portion of the rake head shank and a single clamping bolt 9 may be utilized to secure the plates in operative position upon the shank, said bolt further engaging and retaining the angular end of the integral yoke formed by resilient arms 6. When bolt 9 is tightened the yoke is clamped tightly against the shank S of the rake and rigidly connected therewith.

In operation it will be seen that a substantial portion of stripper plate 5 projects beyond the forward or working edge of the rake. The downward movement of the stripper plate is limited by engagement of the outer portions of arms 6 with the upper longitudinal edge or back of the rake head. In normal operation, when the rake is engaged with the ground the stripper plate is raised, frictionally scraping the ground in the raking movement and placing tension upon the resilient arms 6. Material, such as leaves, grass or rubbish which collects upon the working teeth of the rake is disposed below the stripper plate and when the rake is raised from engagement with the ground to place the teeth for the next raking movement, the tensioned resilient arms 6, slightly aided by the effect of gravity upon the weight of the stripper plate, moves the plate downwardly, the apertured portions scraping and forcing outwardly and downwardly all material collected upon the teeth.

It will be seen that due to the fact that in my improved device an integral substantially flat plate is utilized rather than teeth or sinuously curved wire for removing collected material, there will be no tendency for the collected material to wedge between the teeth and the stripper element.

It will further be seen that the unrecessed forwardly projecting portion of my stripper plate 5 in the operation of the rake frictionally scrapes the ground and in garden use will smooth the dirt and break up small clods, while in use upon lawns it will scrape small material or articles such as acorns and small twigs in the desired direction of the material collected. I contemplate the use of my rake as an efficient means for the collection of acorns and the like by providing a downturned element or toothed flange at the forward longitudinal edge of plate 5.

My improved structure is strong and durable, cannot be easily bent out of shape and can be manufactured at very low cost.

It will, of course, be understood that various changes may be made in the form, details, proportions and arrangement of the parts without departing from the scope of my invention, which, generally stated, consists in a device capable of carrying out the objects above set forth, and in the novel parts and combinations of parts disclosed and defined in the appended claims.

What is claimed is:—

1. An automatic cleaning attachment for a rake comprising an elongated substantially flat stripper plate constructed of sheet material and having a series of substantially circular recesses disposed adjacent the inner longitudinal edge thereof for accommodating the rake teeth, said plate being disposed in a plane extending at an angle to the rake teeth with its outer longitudinal edge disposed some distance outwardly of the rake and provided with an upturned longitudinal flange, a pair of resilient arms disposed above the rake head and having downwardly turned outer ends secured to said flange, means for securing the inner ends of said arms to the rake and a pair of downwardly extending rigid braces for securing the inner longitudinal edge of said plate to intermediate portions of said resilient arms, said braces being disposed inwardly of the rake teeth.

2. In combination with a rake having the usual toothed head secured to a handle by means of a suitable forked shank, an automatic cleaning attachment comprising an elongated stripper plate having a series of aligned apertures for accommodating the teeth of the rake, the outer longitudinal edge of said stripper plate projecting for some distance outwardly from the rake head for engagement with the ground, a resilient connection yoke the arms of which are downwardly turned at their outer portions and connected at their extremities with the outer longitudinal edge of said stripper plate, said yoke having a V-shaped inner end and an attachment bracket comprising a pair of cooperating clamping plates having diverging inturned flanges for cooperatively surrounding the forked portion of the shank of the rake head and a single clamping bolt extending substantially perpendicularly through said cooperating clamping plates and passing through the V-shaped portion of the resilient yoke to retain said yoke against longitudinal displacement, said bolt also being operative to draw said clamping plates together.

In testimony whereof I affix my signature.

CHARLES F. REITER.